United States Patent [19]

Bucher

[11] Patent Number: 4,587,094

[45] Date of Patent: May 6, 1986

[54] FUEL ROD ASSEMBLY FOR A NUCLEAR REACTOR

[75] Inventor: George D. Bucher, Allison Park, Pa.

[73] Assignee: Westinghouse Electric Corp., Pittsburgh, Pa.

[21] Appl. No.: 584,229

[22] Filed: Feb. 27, 1984

[51] Int. Cl.⁴ .............................................. G21C 3/10
[52] U.S. Cl. .................................... 376/451; 376/431; 376/456
[58] Field of Search ........................ 376/451, 456, 431

[56] References Cited

FOREIGN PATENT DOCUMENTS 1238589 4/1967 Fed. Rep. of Germany ...... 376/451
54-108186 8/1979 Japan ................................. 376/451

*Primary Examiner*—Donald P. Walsh

[57] ABSTRACT

An improved end plug is provided for a nuclear fuel rod assembly. The end plug is of an integral construction having an upper shoulder portion which abuts the top edge of a fuel tube and a circular body portion adapted to be inserted into the end of the fuel tube in a force fitting relationship. A flat is provided on the lower body portion so as to define a gap between the lower body portion and the inner wall of the fuel tube upon partial insertion of the plug into the tube, the gap providing an orifice for introducing an inert-gas under pressure into the tube. Upon total insertion of the lower body portion of the plug into the tube, the gap is eliminated and metal-to-metal contact is made between the lower body portion of the plug and the end of the fuel tube for sealing the pressurized gas and a nuclear fuel within the fuel tube.

9 Claims, 7 Drawing Figures

FIG. 1
FIG. 2
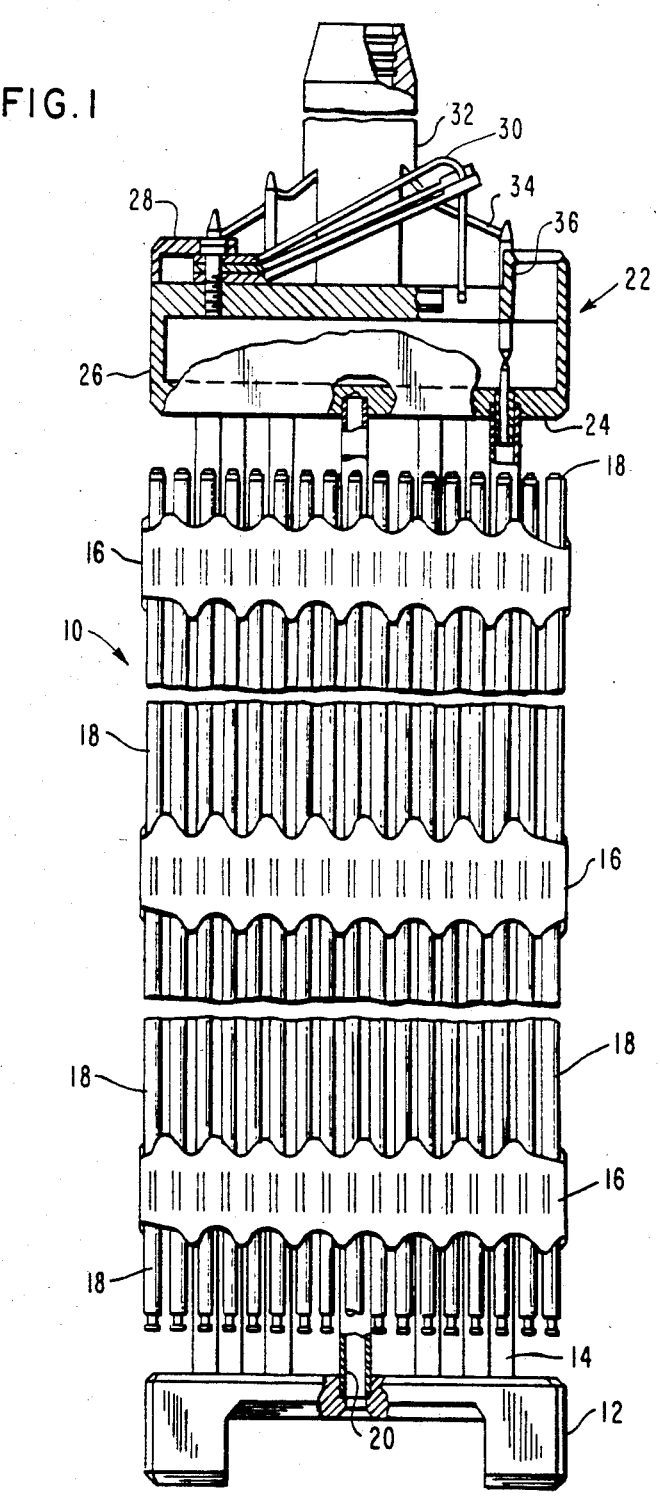
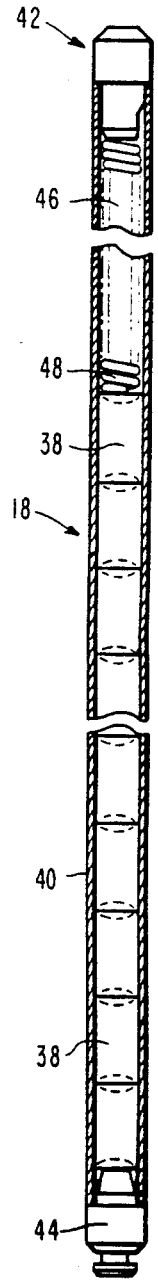

FUEL ROD ASSEMBLY FOR A NUCLEAR REACTOR

BACKGROUND OF THE INVENTION

The present invention relates generally to fuel assemblies for nuclear reactors and, more particularly, is directed to a nuclear fuel rod having an improved end plug for sealing a pressurized gas within the fuel rod.

As is well known in the art, the overall efficiency of a nuclear reactor can be increased and the useful life of its fuel rods prolonged if the fuel rods are internally pressurized. The concept of pressurized fuel rods is set forth in U.S. Pat. No. 3,677,894, granted to Harry M. Ferrari, which discloses a fuel rod having a thermally-decomposable body located therewithin, which when heated, generates a gas to internally pressurize the fuel rod.

Another manner of pressurizing fuel rods is during fabrication thereof wherein one of its end plugs is provided with an inlet gas orifice which is subsequently welded closed after the fuel rod has been filled with an inert-gas under pressure. One type of such an end plug can be seen in U.S. Pat. No. 4,075,454, granted to Duncan et al. The Duncan et al. end plug has a radially extending, gas inlet orifice which leads into a central machined out area of the plug (cavity) for direct flow communication with the inside of the fuel rod. After the fuel rod is filled with a pressurized gas, the inlet orifice is sealed closed with a weld puddle as the end plug is welded on the end of the fuel rod. Besides the costly machining of the central cavity in the plug, it is very difficult to seal the inlet orifice due to peel back problems. Additionally, such seal requires a time consuming and expensive inspection operation to insure that the seal is proper. Another type of end plug can be seen in the German No. 1,238,589 patent which appears to show a flat on the reduced diameter portion of the end plug for rod pressurization followed by a girth seal weld. Similar in construction and operation to the German end plug, the inventor is aware of an end plug having its reduced diameter portion provided with four small, circumferentially spaced, longitudinally extending grooves that extend the full axial height of the plug's reduced diameter portion. An end plug which has a "pressurization" flat or grooves extending the entire length of its reduced diameter is very difficult to seal by girth welding, yet alone, to obtain a proper seal that insures against leakage. Rather than having complete metal-to-metal contact of the end plug with the end of the fuel tube, the "flat" or "grooves" define a void, and thus, during the welding operation, there is no place for the heat to dissipate which results in the tube wall melting back ("peel back").

Yet another, and one of the most common end plug constructions used for pressurizing a fuel rod during the fabrication stage can be seen in Boyko et al. U.S. Pat. No. 4,003,788 which shows an end plug provided with a small axial bore. In such an arrangement, the end plug is first hermetically sealed by girth welds on the end of the tubular cladding, the rod is then placed in a pressurized weld chamber where the gas under pressure enters into the rod through the axial bore, and then the bore opening is fused closed, such as, by one or another one of the methods described in U.S. Pat. Nos. 3,683,148; 3,725,635; or 3,842,238. The method generally used for closing this gas inlet opening (passageway) in the end of the plug is the well known TIG (Tungsten Inert-Gas) process wherein the opening is sealed by a short duration (approximately 2 seconds) weld pulse that produces a fusion weld across the opening. During this welding operation, the molten material is propelled into the passageway by the arc "blast" to produce a nugget sealing the end and extending into the passageway, often as a series of droplets. It is very difficult to insure that what appears as adequate penetration is indeed weld of high integrity fused to the wall of the passageway. Inspection of the seal weld by non-destructive means is difficult and time consuming, and the expensive state of the art inspection devices required are of marginal reliability and effectiveness. Additionally, the close proximity of the electrode and the turbulence created by the arc has the demonstrated potential to contaminate the weld with diffused tungsten which has been found in recent studies to be a factor in predicting cycle coolant activity.

Consequently, there exists a need for an end plug for fuel rod pressurization during the fabrication stage which not only provides for metal-to-metal contact of the plug with the end of the fuel tube to thereby eliminate any possible peel back problems when applying a girth weld, but also, an end plug that does not require an axial bore orifice to fill the rod with a pressurized gas and the many problems associated therewith in obtaining a proper seal.

SUMMARY OF THE INVENTION

The present invention provides an end plug designed to satisfy the aforementioned needs. The configuration of the end plug is such that upon partial insertion into the end of a fuel rod, it provides an orifice for introducing a gas under pressure into the rod, and then upon total insertion, it seals the pressurized gas within the rod. In its totally inserted position, there is complete metal-to-metal contact between the reduced diameter portion of the plug and the inside wall of the fuel rod, thus eliminating the many problems associated with the prior art end plugs.

Accordingly, the present invention sets forth a nuclear reactor fuel rod assembly including a tubular cladding member or fuel tube, nuclear fuel and gas under pressure disposed within the tube, and end plugs at opposite ends of the tube for sealing the fuel and the pressurized gas within the tube. At least one of the end plugs has an upper shoulder portion and a lower integral circular body portion. The upper shoulder portion is of a diameter greater than the inner diameter of the fuel tube for abutment with the end of the tube, preferably forming a butt-joint which is hermetically sealed by welding. The lower circular body portion of the plug is of a dimensional size to be inserted into the end of the tube in a force fitting relationship. A flat is provided on the lower body portion such that upon partial insertion of the lower body portion into the tube, the flat defines a gap between the inner wall of the tube and the lower body portion of the plug. The gap provides an orifice for introducing a gas under pressure into the tube. Total insertion of the lower body portion of the plug into the end of the tube eliminates the gap and provides metal-to-metal sealing contact of the plug with the tube.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a partially sectioned elevational view, with parts being broken away for clarity, of a conventional nuclear fuel assembly having a fuel rod formed in accordance with the principles of the present invention.

FIG. 2 is an enlarged sectional view of one of the fuel rods removed from the assembly shown in FIG. 1.

DETAILED DESCRIPTION OF THE INVENTION

Figure 3:
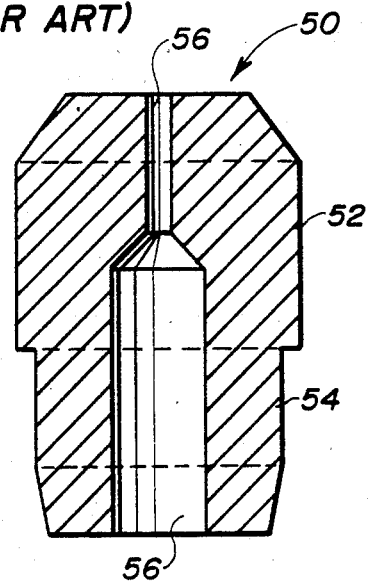
FIG. 3 is a sectional view of a prior art end plug having an axial passageway for inlet of a pressurized gas into the fuel rod.
Figure 4:
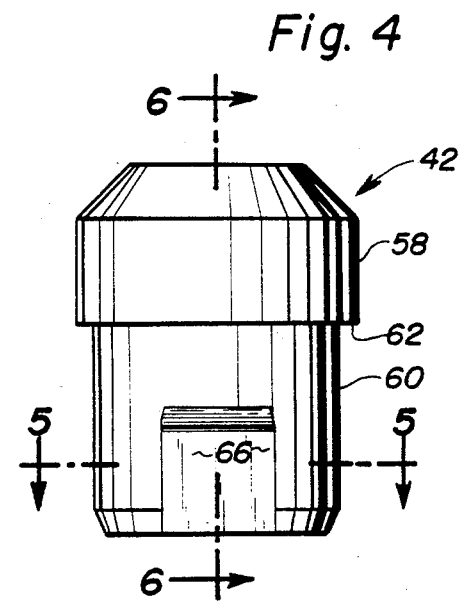
FIG. 4 is an enlarged elevational view of the upper end plug of the fuel rod seen in FIG. 2, with the end plug being rotated ninety degrees from its position seen in FIG. 2 so as to show a frontal view of the flat.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown a partially sectioned elevational view, with parts broken away for clarity, of a fuel assembly constructed in accordance with well-known practices, being indicated generally by the numeral 10, which incorporates a preferred embodiment of the invention.

The fuel assembly 10 basically comprises a lower end structure or bottom nozzle 12 for supporting the assembly on the lower core plate (not shown) in the core region of a reactor (not shown); a number of longitudinally extending control rod guide tubes or thimbles 14 projecting upwardly from the bottom nozzle 12; a plurality of transverse grids 16 axially spaced along the guide thimbles 14; an organized array of elongated fuel rods, generally designated by the numeral 18, transversely spaced and supported by the grids 16; an instrumentation tube 20 located in the center of the assembly; and an upper end structure or top nozzle, generally designated by the numeral 22, attached to the upper ends of the guide thimbles 14 to form an integral assembly capable of being conventionally handled without damaging the assembly components.

The top nozzle 22 includes a transversely extending adapter plate 24 having upstanding sidewalls 26 secured to the peripheral edges thereof in defining an enclosure or housing. An annular flange 28 is secured to the top of the sidewalls 26. Suitably clamped to the annular flange 28 are leaf springs 30 (only one of which being shown in FIG. 1) which cooperate with the upper core plate (not shown) in a conventional manner to prevent hydraulic lifting of the fuel assembly caused by upward coolant flow while allowing for changes in fuel assembly length due to core induced thermal expansion and the like. Disposed within the opening defined by the annular flange 28 is a conventional rod cluster assembly 32 having radially extending flukes 34 being connected to the upper end of the control rods 36 for vertically moving the control rods in the control rod guide thimbles 14 in a well-known manner.

The fuel assembly 10 depicted in the drawings is of the type having a square array of fuel rods 18 with the control rod guide thimbles strategically arranged within the fuel rod array. To form fuel assembly 10, the transverse grids 16 are attached to the longitudinally extending guide thimbles 14 at predetermined axially spaced locations; the fuel rods 18 are inserted through the grids 16; the lower nozzle 12 is suitably attached to the lower ends of the guide thimbles 14; and then the top nozzle 22 is attached to the upper ends of the guide thimbles 14 in a conventional manner. The fuel assembly 10, shown in FIG. 1, is conventional, being merely representative of a type of fuel assembly that utilizes a fuel rod 18 (hereinafter referred to as a fuel rod assembly) which has been constructed in accordance with the principles of the present invention and which will now be discussed in detail.

Improved Fuel Rod Assembly

As best seen in FIG. 2, the fuel rod assembly 18 includes a plurality of cylindrical nuclear fuel pellets 38, such as $UO_2$ enriched with U-235, disposed end to end within a tubular cladding member or fuel tube 40. The fuel tube 40 is an elongated thin-walled tube, preferably of a zirconium alloy. The opposite ends of the fuel tube 40 are closed by upper and lower end plugs, preferably formed of the same material as the fuel tube, to seal the nuclear fuel as well as an inert gas under pressure within the fuel tube. The upper end plug, generally indicated by the numeral 42, is constructed in accordance with the teachings of the invention and will be discussed in further detail later on in this specification, whereas, the lower end plug 44 is of conventional construction, being secured in place by a girth weld or the like. A plenum chamber 46 is provided within the fuel tube 40, between one end of the axial stack of fuel pellets 38 and the adjacent end plug, such as upper end plug 42. A helical spring 48 is disposed within the plenum chamber 46, between the pellets 38 and the upper end plug 42 functioning to hold the pellets 38 compactly in place against the lower end plug 44.

As stated earlier, the fuel rod assembly 18 is internally pressurized and the manner for introducing an inert-gas under pressure into the fuel tube 40 resides in the novel design configuration of the upper end plug 42; however, before discussing end plug 42, it is believed that a quick review of a prior art end plug, such as end plug 50 shown in FIG. 3, would provide the reader with a clearer understanding and a better appreciation of the advantageous features of the end plug of the present invention. Prior art end plug 50 is of the type shown and described in the above-mentioned Boyko et al. patent and basically comprises an upper body portion 52, a lower body portion 54 of a reduced diameter, and an axial bore 56 extending through the upper and lower body portions for flow communication from the interior to the exterior of a fuel rod. The lower body portion 54 is press fitted into the end of a fuel tube and a girth weld seals the butt-joint to thereby secure the end plug on the end of the fuel tube. In a pressurized weld chamber, an inert-gas is injected into the fuel tube, via axial bore 56, and then the end of the bore is sealed by welding.

The design of end plug 42 of the present invention, as best seen in FIGS. 4-7, does not include any such axial bore, but rather is of a solid construction thereby eliminating the costs associated with drilling a bore as well as overcoming the problems of suitably sealing the end of such a bore as was earlier discussed in this specification. End plug 42 is of an integral construction including an upper shoulder portion 58, having a diameter greater than the inner diameter of the fuel tube 40, and a lower circular body portion 60, having a diameter less than the diameter of the upper shoulder portion 58 and slightly larger than the inner diameter of tube 40 so as to be inserted into the end of the fuel tube in a press fit or force fitting relationship. In the preferred embodiment, the diameter of the shoulder portion 58 is generally equal to the outer diameter of tube 40 and the difference between the diameter of the shoulder portion and the lower body portion 60 is approximately equal to the thickness of the wall of fuel tube 40. The arrangement is such that when the plug 42 is pressed into the end of the fuel tube 40, the lower edge 62 of shoulder portion 58 forms a butt-joint with the top edge 64 of tube 40.

Figure 5:
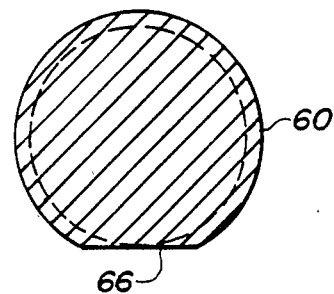
FIG. 5 is a sectional view, as taken along line 5—5 of FIG. 4, looking down on the lower body portion of the end plug.
Figure 6:
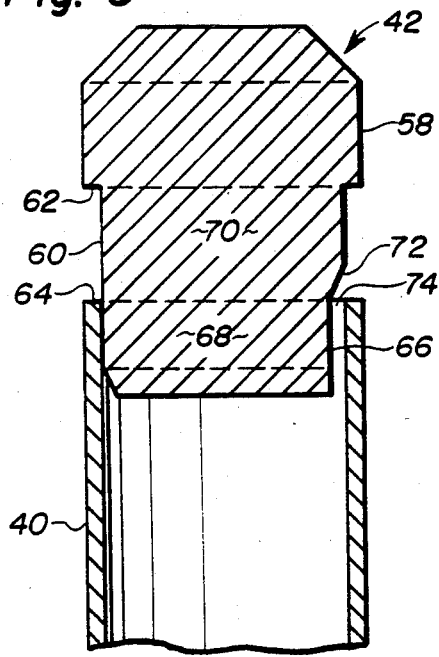
FIG. 6 is a sectional view, as taken along line 6—6 of FIG. 4, showing the end plug being partially inserted into the upper end of the fuel tube.
Figure 7:
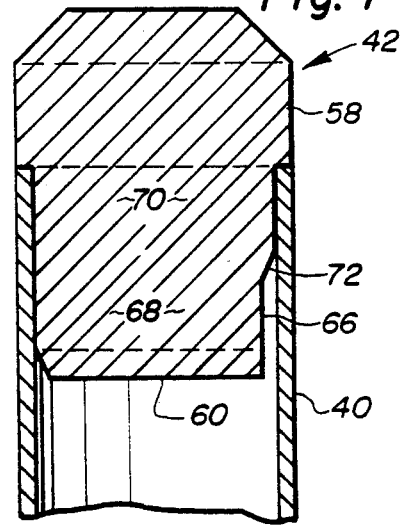
FIG. 7 is a view similar to FIG. 6 but with the lower body portion of the end plug being totally inserted into the end of the tube and with the upper shoulder portion being in abutment with the end of the tube.

The lower body portion 60 of end plug 42 is provided with a flat 66, preferably formed by a segment being removed from the circular body portion (see FIG. 5). As seen in FIGS. 6 and 7, the flat 66 extends generally parallel to the longitudinal extent of the fuel tube 40. The flat 66 begins at the bottom edge of the lower body portion 60 and extends upwardly therefrom to the approximate mid-section of the lower body portion. For reference, the section of the lower body portion 60 containing the flat 66 will be referred to as the inner part 68, whereas the other section of the lower body portion, above the flat and adjacent the upper shoulder portion 58, will be referred to as the outer part 70. In the preferred embodiment, the horizontal chord length of the flat 66 is approximately equal to the radius of the lower portion 60 and the axial height of the flat (and likewise the inner part 68) is approximately equal to one-half of the axial height of the lower portion 60, both of these dimensions being merely a design choice and are not critical to the invention. Further, it is preferred that the inner part 68 and the outer part 70 of the lower body portion 60 be of an equal generally constant diameter. It will also be noted, as best seen in FIGS. 6 and 7, that the transition surface 72, extending between the upper edge of the flat 66 and the lower edge of the outer part 70, be slanted, preferably at an inclined angle of approximately twenty-five degrees from vertical.

Now, while referring to FIGS. 2, 6 and 7, the manner of assembling fuel rod assembly 18 will be briefly described. The lower end plug 44 is welded on the lower end of the fuel tube 40, the fuel pellets 38 are placed in the fuel tube, the helical spring 46 is placed on the top of the stack of fuel pellets and then the upper end plug 42 is pressed (force fitted) into the upper end of fuel tube 40 to an axial position such that only the inner part 68 of the lower body portion 60 extends into the end of the fuel tube 40. In such partially inserted position, the flat 66 defines a gap 74 between the inner wall of the fuel tube and the lower body portion 60 of the plug 42, the gap 74 providing an orifice for introducing an inert-gas into the tube 40. The fuel rod assembly 18, with its partially inserted end plug, is placed into a pressurized weld chamber where the tube is pressurized with an inert-gas (via orifice gap 74) and then the end plug is totally inserted such that the gap 74 is eliminated and metal-to-metal sealing contact is made between the outer part 70 of lower body portion 60 and the inner wall of tube 40, as shown in FIG. 7. In such seated position, the butt-joint formed between edge 62 of the upper shoulder portion 58 and edge 64 of tube 40 is hermetically sealed by welding.

It is thought that the invention and many of its attendant advantages will be understood from the foregoing description and it will be apparent that various changes may be made in form, construction and arrangement thereof without departing from the spirit and scope of the invention or sacrificing all of its material advantages, the form hereinbefore described being merely a preferred or exemplary embodiment thereof.

What is claimed is:

1. A fuel rod assembly for a nuclear reactor, said fuel rod assembly including a longitudinally extending tubular cladding member having an inner wall, nuclear fuel and a gas under pressure disposed within said member, and end plugs at opposite ends of said member for sealing the fuel and the pressurized gas within said member wherein at least one of said end plugs comprises:
   (a) an upper shoulder portion of a diameter greater than the inner diameter of said tubular member for abutment with the end of said tubular member; and
   (b) a lower circular body portion integral with said upper shoulder portion and adapted to be inserted into the end of said tubular member in a force fitting relationship, said lower body portion including an outer part adjacent said upper shoulder portion and an inner part adjacent the interior of said tubular member;
   (c) said inner part of said lower body portion having a flat defined thereon which extends from a top edge of said flat to a bottom edge of said inner part of said end plug lower body portion and generally parallel to the longitudinal extent of said tubular cladding member, and a transition surface which extends from said upper edge of said flat to a lower edge of said outer part of said end plug lower body portion and is slanted away from the longitudinal extent of said tubular cladding member, such that upon partial insertion of said lower body portion into said tubular member, said flat defines a gap between the inner wall of said tubular member and said lower body portion so as to provide an orifice for introducing a gas under pressure into said tubular member whereas upon total insertion of said lower body portion, said gap is eliminated and metal-to-metal sealing contact is made between said lower portion of said plug and said one end of said tubular member.

2. The fuel rod assembly as defined in claim 1, wherein said flat is defined by a segment being removed from said circular body portion.

3. The fuel rod assembly as defined in claim 1, wherein said outer and inner parts of said lower body portion are of one generally constant diameter.

4. The fuel rod assembly as defined in claim 1, wherein said upper shoulder portion forms a butt-joint with said end of said tubular member.

5. The fuel rod assembly as defined in claim 4, wherein said butt-joint is hermetically sealed by welding.

6. The fuel rod assembly as defined in claim 1, wherein the outer diameter of said upper shoulder portion is generally equal to the outer diameter of said tubular member.

7. The fuel rod assembly as defined in claim 1, wherein the difference between the outer diameter of said upper shoulder portion and the outer diameter of said lower body portion is generally equal to the thickness of the wall of said tubular member.

8. The fuel rod assembly as defined in claim 1, wherein said end plug and said tubular member are formed of an alloy of zirconium.

9. The fuel rod assembly as defined in claim 1, wherein said transition surface is slanted away from the longitudinal extent of said tubular member inner wall at an angle of approximately twenty-five degrees.

* * * * *